Patented Feb. 9, 1937

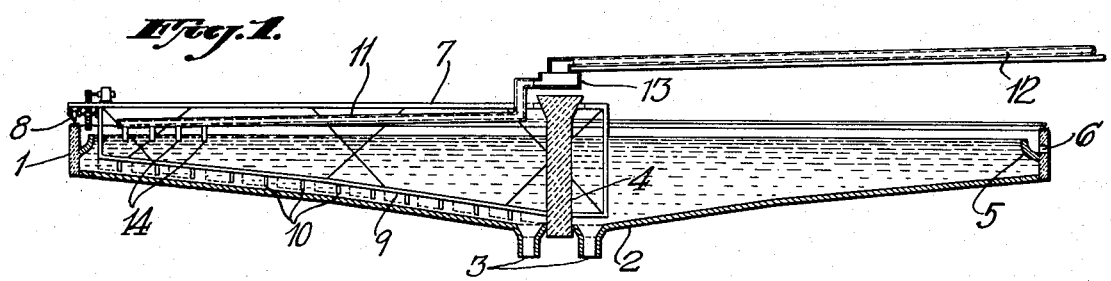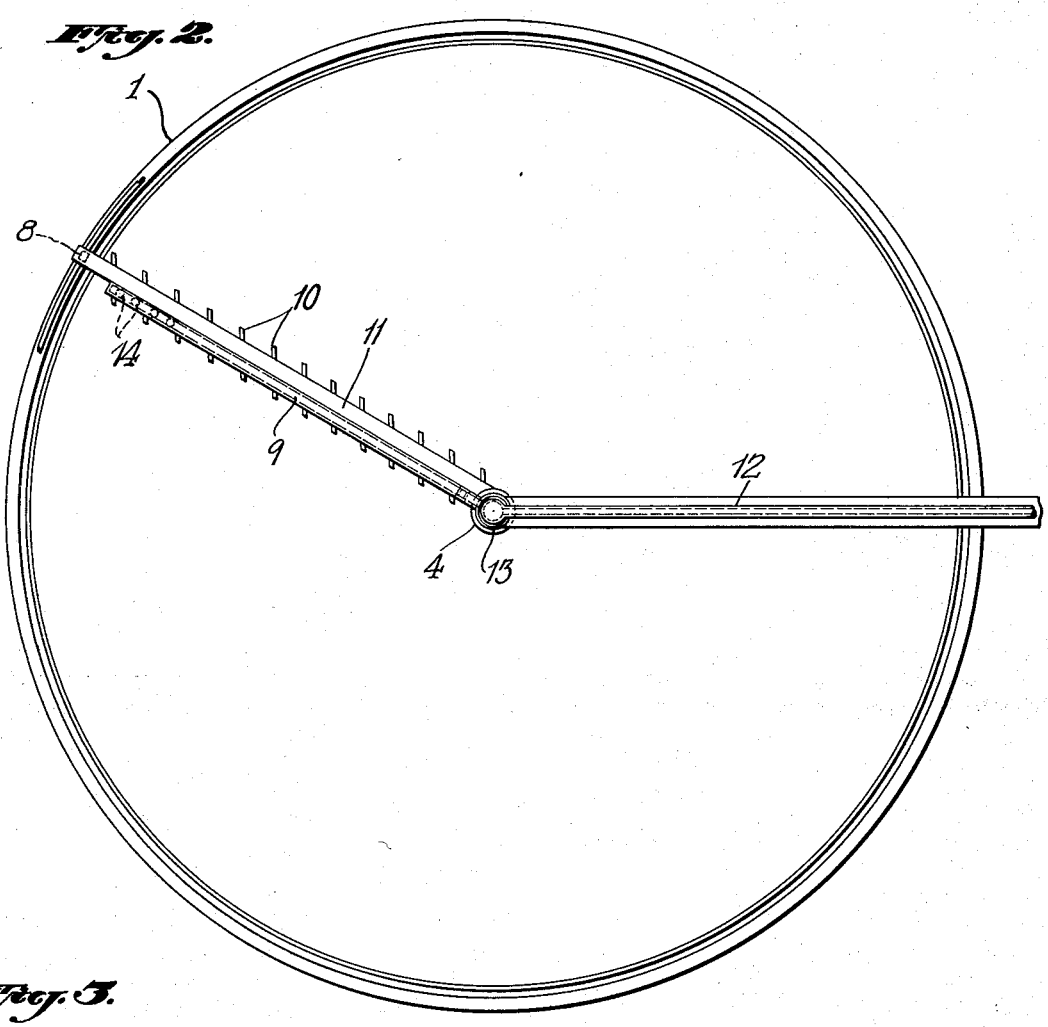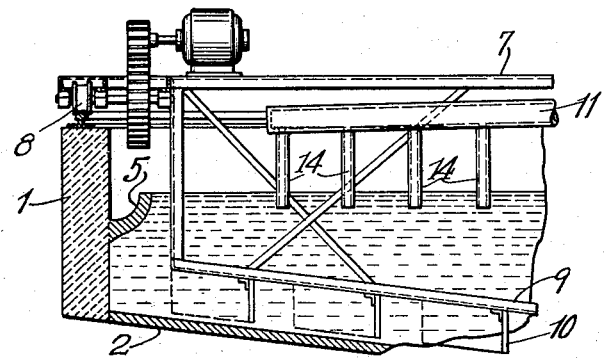

2,069,989

UNITED STATES PATENT OFFICE 2,069,989

OPERATING THICKENER

Henry F. Adams, Inspiration, Ariz.

Application February 19, 1935, Serial No. 7,172

3 Claims. (Cl. 210—55)

The invention relates to the treatment of slimes and the like in thickeners of the common circular tank type in which the feed consists of solids suspended in a comparatively large proportion of liquid, the purpose being to let the solids settle and to rake them to a central sludge discharge, the liquid being collected by overflowing into a launder within the tank. The rakes rotate slowly over the bottom, being angled so as to gradually move the sludge towards the center.

The capacity of a tank in tons of solids which it can treat per day is generally assumed to vary directly as the area, the depth and volume being of secondary importance.

The invention aims to utilize the area more efficiently by spreading the feed circumferentially. An ideal condition in this respect would be to have each unit of surface receive an equal portion of the feed. The invention approximates this ideal by feeding the material in a number of locations extending around the center. Preferably also the feed or most of it is located at or near the periphery of the tank so that the sludge has to travel the full radial distance, and the maximum effect of the treatment is obtained.

The desired distribution may be effected in various ways. For example a radial feed pipe may discharge at desired points of its length, being slowly rotated so as to distribute the fresh feed in one or more continuous circles around the center. Such a feed pipe may be independently rotated or may be supported at the rear of and rotated with the rake supporting structure; or it may be replaced by stationary pipes arranged to feed the tank at numerous points around the center.

The accompanying drawing illustrates the invention more or less diagrammatically; Fig. 1 being in vertical section, and Fig. 2 in plan; Fig. 3 is an enlarged detail of a portion of Fig. 1.

The tank has a circular wall 1 and a conical bottom 2 with outlets 3 around a central fixed post 4. The sludge runs out of the outlets 3 and the liquid overflows into the launder 5 and thence through an outlet 6. A radial arm 7 is pivoted on the central post and bears through rollers 8 on the outer wall 1 and is slowly rotated by a suitable driving mechanism. From the arm 7 depends a rake 9 having a number of inclined blades 10 which push the sludge around and also towards the center.

Mounted on the rear face of the rake supporting structure 7 is a tube or launder 11 which rotates with it and which receives its feed from a fixed launder 12 discharging into the central end portion 13 of the rotating launder. The latter is provided with downward outlets 14 near the outer end so as to feed the slimes in continuous circles near the periphery of the tank just behind the slowly rotating rakes. In tanks of the type using two or more rakes, each rake may carry such a launder.

In any case the launder may be independently supported and rotated, preferably but not necessarily synchronously with the rake. The actual location of the down spout or spouts through which the feed is discharged into the thickener may be varied according to circumstances. When the feed is of such material as to call for the maximum contact time obtainable (so as to secure additional leaching of copper, for example) the feed point should be as near the periphery as possible, say through one or two down spouts near the outer end of the rotating launder.

On the other hand, a thickener may be receiving feed which has been practically leached. Obviously then contact time has lost its importance and the problem is one of simple washing, that is, separating and recovering the metal bearing solution from the solid material. In this case perhaps the most efficient way to introduce the feed is through a long slot or series of down spouts, so that the feed would enter the thickener in a ribbon-like manner, continuous or broken respectively.

Other variations of the location of the feed points may be provided according to the extent of radial movement desired. The rotating launder is a simple structure which can be readily altered or replaced by another when a change is desired.

One advantage of the invention is the control which the operator has of the feed from the rotating launder, so that it can be directed and placed at the operator's discretion.

With stationary feeding at fixed points, the pulp or slime has to be spread from such points. It is absurd to suppose that each unit volume of pulp will seek out and flow to an allotted unit area; which is essential to uniform settling and washing in order to remove from the slime the particles of copper or other mineral solution entrapped with the solids. The present invention automatically allots to unit segments of the tank unit volumes of pulp. Thus the entire area of the tank is utilized equally which would improve the recovery of the water soluble copper, would effect better settling, a saving in acid which is now used to aid settling, a saving in iron as the thickener solutions eventually pass through the precipitating plant where iron is wastefully consumed by excess acid. There is a direct advantage in increasing the capacity of a given thickener by the improvement in its settling efficiency.

With old methods it appears that a portion of the feed passes down and out of the thickener by a shorter circuit than the average. For example, the theoretical contact time of the solids for four thickeners in series under normal conditions may be six days; whereas a portion of the feed may be short circuited through the entire system in a few hours, with corresponding efficiency in leaching. Settling in the tank is improved by the rotating feed. The point or points at which the feed enters the thickener are continually changing as the launder revolves, and the solids have time to settle before the launder makes a complete revolution. As the feed spreads out over a much greater area, the coarser particles will tend to drag down the finer ones and help them settle. More efficient settling means increased settling capacity and a greater tonnage can be treated. Improved settling smooths out the whole thickening operation and less supervision is required.

The invention can be applied not only to copper plants but also to gold and silver cyanide plants, to the chemical industry or to any process which is directed to the separating and recovering of impregnated solution from solid material.

"Classification" of the feed to a thickener is possible by installing two launders, one above the other, extending from the center of the tank toward the periphery. The feed enters the top launder at the center of the tank and flows outward, thence through a down spout into the bottom launder and back toward the center of the tank. Downspouts are placed in the lower launder at intervals. The feed is thus "classified", coarser particles settling near the periphery and the finer ones carried on toward the center.

The advantage of classification is quite apparent when it is realized that the coarser sizes are the ones which contain the unleached copper and additional time is necessary for further leaching. The coarser sizes settle quickly, so it would be possible to introduce them at a point quite near the periphery without danger of having a cloudy overflow. The finer sizes settle more slowly, so by introducing them at the center of the tank more time would be given them to settle and less chance they would have of being carried out toward the periphery. These finer sizes are practically leached and it is advantageous to discharge them from the thickener as quickly as possible.

Various modifications of the process and apparatus as above described may be made by those skilled in the art without departing from the invention as defined in the following claims.

What I claim is:

1. The method of thickening slimes in a tank having an overflow launder at the surface level of the body being treated and having a conical bottom sloping downward to a central discharge for the thickened material, said method comprising the feeding of the fresh slimes directly into the top of the body of slimes within the tank in numerous locations around the center near the periphery, and slowly raking the solids on the bottom and forcing them toward the center so that the sludge which entered near the periphery is forced to travel substantially the full radial distance of the tank and the maximum effect of the treatment is obtained, keeping the body of the slimes in the tank as quiet as possible so as to effect the settling of the solids, drawing off the thinned liquid at the top and the thickened product through the central discharge.

2. The process of claim 1, comprising also the feeding of the fresh slimes in numerous locations around the center at different distances therefrom so as allot to unit segments of the tank approximately unit volumes of the fresh slimes and to use approximately uniformly the settling and washing effect over the entire area of the tank.

3. A thickener for slimes or the like comprising a tank with a peripheral overflow launder at the surface level of the body of slimes within the tank and having a conical bottom sloping downward to a central discharge opening, a rake on the bottom adapted to force the solids toward the central discharge, means for rotating the rake slowly so as to keep the slimes as quiet as possible in order to effect the settling of the solids, means for feeding the fresh slimes comprising a feed pipe above the level of the body in the tank, pivoted at the center, and means for rotating the same, said feeding means having an outlet near the periphery of the tank so that as it is rotated the fresh slimes are fed directly into the top of the body within the tank in a continuous circle near the periphery and compelled to travel substantially the full radial distance of the tank and to obtain the maximum effect of the treatment.

HENRY F. ADAMS.